United States Patent [19]

Perilhon

[11] Patent Number: 4,814,675
[45] Date of Patent: Mar. 21, 1989

[54] DEVICE LIMITING THE POWER SUPPLY CURRENT FOR A DIRECT CURRENT MOTOR EQUIPPED WITH SUCH A DEVICE

[75] Inventor: Alain F. Perilhon, Bretigny S/Orge, France

[73] Assignee: Valeo, Paris, France

[21] Appl. No.: 205,036

[22] Filed: Jun. 9, 1988

Related U.S. Application Data

[63] Continuation of Ser. No. 86,131, filed as PCT FR86/00388 on Nov. 17, 1986, published as WO87/03433 on Jun. 4, 1987, abandoned.

[30] Foreign Application Priority Data

Nov. 21, 1985 [FR] France ................ 85 17224

[51] Int. Cl.⁴ .......................... H02P 6/02; H02P 5/17
[52] U.S. Cl. .................................... 318/254; 318/599
[58] Field of Search ............... 318/138, 254, 430, 431, 318/439, 599

[56] References Cited

U.S. PATENT DOCUMENTS

| | | | |
|---|---|---|---|
| 4,055,788 | 10/1977 | Greeley | 318/624 |
| 4,300,081 | 11/1981 | Van Landingham | 318/599 |
| 4,510,422 | 4/1985 | Ogura | 318/254 |
| 4,541,029 | 9/1985 | Ohyama | 318/430 X |
| 4,578,623 | 3/1986 | Tsukutani et al. | 318/138 X |
| 4,595,865 | 6/1986 | Jahns | 318/138 X |
| 4,603,283 | 7/1986 | Oltendorf | 318/138 X |
| 4,631,458 | 12/1986 | Furuichi | 318/254 |

FOREIGN PATENT DOCUMENTS

| | | |
|---|---|---|
| 0089150 | 9/1983 | European Pat. Off. . |
| 3218740 | 11/1983 | Fed. Rep. of Germany . |
| 2092780 | 8/1982 | United Kingdom . |

*Primary Examiner*—Bentsu Ro
*Attorney, Agent, or Firm*—Armstrong, Nikaido, Marmelstein & Kubovcik

[57] ABSTRACT

A device limits the power supply current for a direct current electric motor with electronic switching. The stator of the motor comprises several windings angularly displaced and successively energized by an electronic switching device to create an electric field. The device is arranged so as to establish a limitation of the current in accordance with an operating parameter of the motor according to a relation which takes the variation of the load into account according to the parameter and which only authorizes a slightly higher current than that necessary for normal operation.

7 Claims, 3 Drawing Sheets

DEVICE LIMITING THE POWER SUPPLY CURRENT FOR A DIRECT CURRENT MOTOR EQUIPPED WITH SUCH A DEVICE

This application is a continuation of application Ser. No. 086,131, filed as PCT FR86/00388 on Nov. 17, 1986, published as WO87/03433 on Jun. 4, 1987, now abandoned.

FIELD OF THE INVENTION

The invention relates to a device limiting the power supply current for a direct current electric motor with electronic switching. The stator of the motor comprises several windings, displaced angularly and energized successively by an electronic switching device, to create a rotating field. The motor is intended to drive a load setting up of resisting torque increasing in relation to the speed of rotation.

BACKGROUND OF THE INVENTION

It is known that the electronic switching can comprise various components, in particular transistors, which are relatively fragile and liable to be destroyed by unduly high excess currents. Now it may happen that an electric motor driving a load is accidentally blocked, which can produce a high current in the stator windings and can damage the electronic switching device.

SUMMARY OF THE INVENTION

The object of the invention is, above all to provide a device limiting the power supply current for a direct current electric motor with electronic switching, which makes it possible to considerably reduce the risk of damaging the electronic switching device without impeding the operation of the motor under steady conditions. The object of the invention is also to provide a limiter device which would be straightforward and economical to manufacture, while being efficient.

The invention is a device which limits the power supply current for a direct current electric motor with electronic switching. The stator of the motor comprises several windings, displaced angularly and energized successively by an electronic switching device, in order to create a rotating field. The motor is intended to drive a load setting up a resisting torque increasing in relation to the speed of rotation. The device is arranged to establish a limitation of the current according to the speed of the motor in accordance with a relation which takes the variation of the load driven by the motor into account, according to the speed of rotation and which only authorizes a slightly higher current than that necessary for normal operation. The relation the current being provided to ensure a sufficient margin at the starting of the motor, to ensure a satisfactory rise in speed of the motor. The relation for the variation of the current in relation to the speed of rotation of the motor has a rising portion followed by a plateau.

Preferably the ascending portion of the current variation relation is formed substantially by a section of a straight line.

The limiter device comprises a device for sensing the operating parameter of the motor, constituted by the speed of rotation, capable of establishing an output signal representing the value of the parameter and a device for controlling the power supply current for the electric motor according to the output signal.

Advantageously the power supply for the electric motor is ensured by a chopper device with a cyclic ratio adjustable by an adjustment device. The limiter device then comprises a circuit for comparing the output signal of the sensing device and a signal coming from the adjustment device. The comparing circuit is capable of controlling the cyclic ratio corresponding to the lower of these two signals.

The above mentioned sensing device supplies an output signal representing the value of the speed.

Preferably the chopper or slicer comprises an N channel field effect MOS transistor (FET).

Advantageously the limiter device is arranged so as to recover the energies of the overvoltages from the stator windings which occur in particular when the actuation of each winding is completed, to set up the operating voltage for the N channel MOS transistor.

The chopping frequency can be of the order of 20 KHz.

The device for controlling the cyclic ratio preferably comprise a "PWM" circuit capable of converting the variations of a control voltage into a variation of the cyclic ratio of a rectangular signal. A frequency/voltage converter receives at the input, signals whose frequency is proportional to the speed of rotation of the motor and supplies at the output a voltage representing the speed. A manual device constituted by a potentiometer in particular, adjusts the value of the cyclic ratio, and the device for comparing the output signal of the frequency/voltage converter and that of the manual adjustment device. These comparing devices are capable of causing the cyclic ratio to be established which corresponds to the lower signal coming from the converter or the adjustment device.

The limiter device defined above is advantageously applied to a motor with electronic switching, whose stator comprises three phases or windings each controlled by a single transistor or equivalent interruptor element.

This limiter device may advantageously be used for an electric motor driving a fan, a turbine blower or similar device having a resisting torque substantially proportional to the square of the speed of rotation. The relation for the variation of the cyclic ratio in relation to the speed of rotation of the motor is then chosen to be substantially linear with a positive gradient in a first portion and with an ordinate at the origin corresponding to a relatively low starting torque.

The invention also concerns a direct current electric motor with electronic switching equipped with a limiter device such as defined above.

Apart from the arrangements set out above, the invention consists of a certain number of other arrangements which will be discussed in greater detail below with regard to a particular mode of embodiment described with reference to the attached drawings but which is in no way restrictive.

DESCRIPTION OF THE PREFERRED EMBODIMENTS

Figure 1:
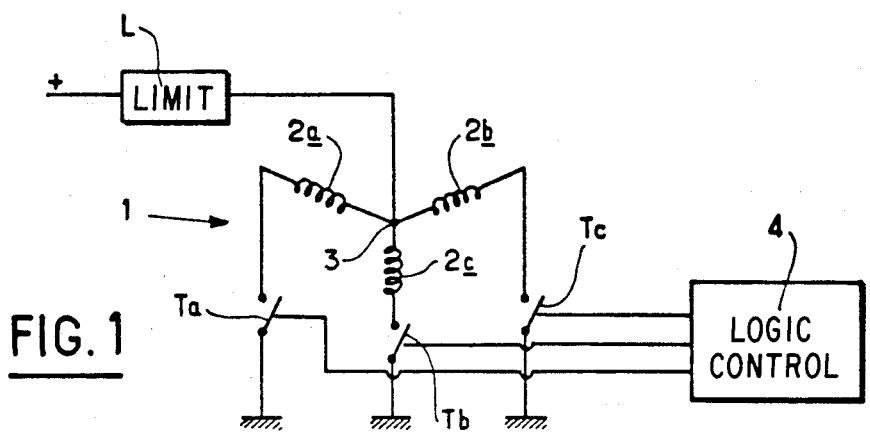
FIG. 1 of these drawings is a simplified electric circuit diagram of the stator of a direct current electric motor with electronic switching.

Referring to FIG. 1 of the drawings, one can see the circuit diagram of the stator 1 of a direct current electric motor with electronic switching. The stator comprises three windings 2a, 2b, 2c angularly displaced by 120° in a star connection. The center point, or common point 3 of these windings is connected to a terminal of the power supply source, for example the + terminal.

The other end of each winding 2a, 2b, 2c is grounded by switching means Ta, Tb, Tc, advantageously formed by three field effect MOS transistors (FET), respectively connected to each winding.

The switching means are controlled by a logic circuit 4 which allows them to be successively energized so as to create a rotating field which causes the rotor (not shown) of the motor to rotate. This rotor is generally of the permanent magnet type.

It is clear that the number of windings need not be three, it can for instance be equal to two, or four, or more.

Provision is made for a device L, schematically represented in FIG. 1 to limit the strength of the power supply current for the stator 1.

Before describing this limiter device, it is necessary to make some references to electric motors to place the invention properly in context.

It is known that in most electric motors, including electric motors with electronic switching, the strength of the electric current passing through the motor and more particularly the stator in the example considered, is limited naturally when the speed of rotation of the motor is high, because of the counter electromotive force developed by the motor.

On the other hand, when the motor is started, the speed of rotation is low. This is also the case with the counter electromotive force, so that a strong current passes through the motor whose strength diminishes as the speed of rotation increases.

The control of the speed of rotation of a direct current motor driving a load is easily obtained by controlling, that is to say, regulating the strength of the current passing though this motor under steady conditions.

The control of the strength of the electric current can be obtained in various ways. It is advantageous to apply chopping or slicing of the direct current with a variable cyclic ratio.

For controlling an adjustable speed, the torque being assumed to be known, and relatively constant for each value of the speed, it will be sufficient to actuate a given cyclic ratio to obtain the desired speed.

Figure 2:
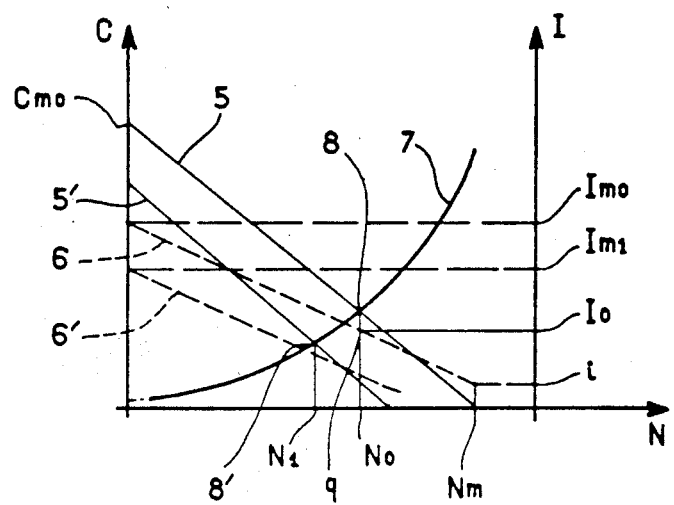
FIG. 2 is a diagram illustrating the variation of the torque and of the strength in a conventional electric motor in relation to the speed of rotation, as well as the variation of the resisting torque of a load driven by this motor.

FIG. 2 illustrates these various settings and possibilities.

In FIG. 2, the values of torque C have been plotted on the axis of the ordinates situated on the left, and the strength I of the current passing through the motor stator, on the y axis on the right. The speed of rotation N of the motor has been plotted on the x axis.

The curve 5, traced as a solid line represents the variation of the torque of the electric motor in relation to the speed of rotation. To simplify, curve 5 is represented in the form of a portion of an inclined straight line with a negative gradient. Depending on the motors, this curve can have less regular trends than the one represented schematically in FIG. 2, but in practice it does nearly always observe a reduction towards the high speeds of rotation.

At zero speed, corresponding to a blocked motor or at the commencement of the start up, the motor torque is at its maximum and takes the value of CmO.

The curve 6, in dashes, represents the variation of the current strength in relation to the speed of rotation. This curve 6 is schematically outlined in the form of a portion of a straight line. The strength value is to be read off on the axis of the ordinates situated at the right. The maximum strength passing through the motor stator occurs during starting or with a blocked motor and corresponds to the value ImO.

At the maximum speed of rotation Nm of the motor the maximum effective torque of the motor has become zero. While the current consumption is minimal and equal to a value i corresponding to a current consumption just sufficient to overcome the inherent losses of the motor.

The curve 7 represents the variations of the resisting torque of a load driven by the motor in relation to the speed of rotation. It has been envisaged that the load driven by the electric motor was a fan in respect of which the resisting torque is substantially proportional to the square of the speed.

Other trends of the curves of the resisting torque than that of curve 7 are possible. In general, the resisting torque increases with the speed.

The set of the system finds its equilibrium at the point 8 at the intersection of curves 5 and 7, at which point the motor torque is equal to the resisting torque. The result of this is a current Io, corresponding to the point q on the current curve. The speed of rotation is No.

The curve 5 corresponds to the operation of the motor energized at its maximum scope, that is to say, at its full power, which corresponds to a cyclic ratio equal to 1 at the level of the limiter device L.

It is, however, possible to supply the electric motor with less power, by acting at the level of the limiter L to reduce the value of the cylic ratio. It will be recalled that the cyclic ratio is, for a period considered, equal to the ratio of the time of conduction of the device L to the total duration of the period considered.

For a lower power of the electric motor, the curve 5' of the torque is situated below the curve 5 and is substantially parallel thereto. The operating point 8' of the system is established at a speed N1 which is lower than No. It will thus be seen that by acting on the effective power of the motor, by variations of the cyclic ratio in the example considered, the equilibrium speed N1 of the system can be adjusted to a value comprised between the maximum possible speed No and zero speed.

The adjustment of the effective power of the motor generates a system of curves 5' of the motor torque substantially parallel to the curve 5 and situated below that curve and a system of strength curves 6' substantially parallel to the curve 6 and situated below it.

From the curves of FIG. 2, it will immediately become apparent that the lower the current strength Imi of the motor at zero speed (blocked motor or starting), the lower the effective power of the motor and hence the speed Ni at the equilibrium of the system.

Although in certain applications, one might desire a high torque on starting (torque at zero speed of the motor) which is in particular the case with traction motors, there are many applications wherein the torque required at a very low speed can be low. This is true, in particular when the resisting torque curve in relation to the speed has the trend of curve 7 in FIG. 2 and corresponds for example to the resisting torque of a fluid system, such as a fan, or pump, which must be driven by the motor.

Proceeding from these considerations, the invention lies in arranging the limiter device for the power supply current so as to establish a limitation of this current in accordance with an operating parameter for the motor according to a relation (represented by the curve g in FIG. 3) which takes the variation of the load driven by the motor into account (curve 7) according to the parameter. The limiting relation only permits a maximum current I1 slightly higher, for example higher by about 2A than that Io necessary for normal operation at full power. The relation limiting the current is scheduled to ensure at the starting of the motor, a sufficient margin to obtain a satisfactory acceleration of the motor. Thus if there is a slowing down, one has a stronger current at one's disposal, and therefore a higher torque to try to continue the rotation, otherwise there would be stalling possibly up to a stoppage.

To curve g, which represents the relation limiting the current strengths, there practically corresponds curve k which represents the relation limiting the torque of the electric motor resulting from this limitation of the strength. This curve k has the same trend as the curve g. The margin h making it possible to ensure the acceleration, is equal to the difference of the ordinates at the origin of the curves k and 7. In the absence of the current limitation at full power, the acceleration torque available at zero speed is equal to H (difference between the ordinates at the origin of curves 5 and 7), clearly higher than h. For example, H exceeds 4h. This is only a non-restrictive example. Frequently one does not desire any high acceleration to go to the high speeds and one therefore does not require any high torque at a low speed.

Figure 3:
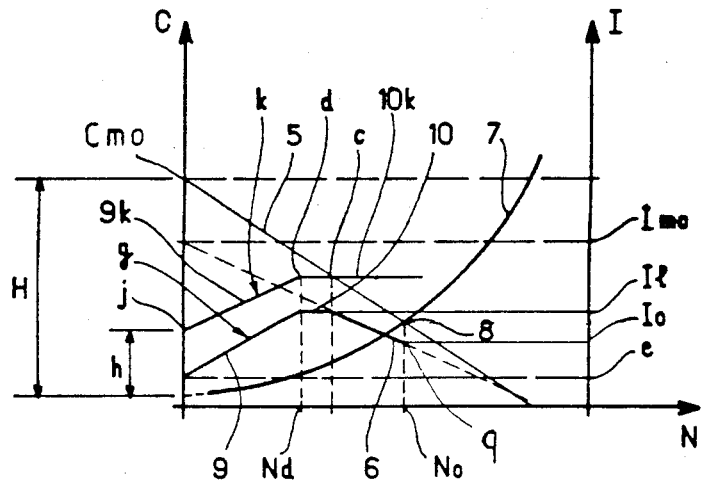
FIG. 3 is a diagram illustrating similarly to FIG. 2, the relation for limiting the torque and the current of the electric motor according to the invention.

In the examples envisaged, and on the diagram of FIG. 3, the operating parameter of the motor considered is the speed of rotation of this motor. Other parameters could be taken into consideration, such as the load supported by the motor or any other parameter providing data regarding the current operation of the electric motor.

Such a relation limiting the current makes it possible to avoid excess currents at a low speed without altering the equilibrium speed, for example No at full power.

Advantageously, the curve g representing the current variation relation permitted by the device L in relation to the speed of rotation of the motor, has a rising portion 9 followed by a substantially horizontal plateau 10, corresponding to the maximum strength I1 permitted by the device L.

The rising portion 9 has substantially the shape of a section of a straight line having a positive gradient, that is to say, that the strength limit permitted by the device L increases progressively in relation to the speed of rotation of the motor from zero speed up to a speed Nd beyond which the strength is maintained at the upper substantially constant limit value I1.

The curve k, representing the relation varying the motor torque comprises a rectilinear rising portion 9k, corresponding to 9 and a plateau 10k corresponding to 10.

The mean gradient of the rising portion of the 9k can be substantially equal to, higher or less than the mean gradient of the portion of the curve 7 of the resisting torque situated below the section 9k.

The plateau corresponds to the strength I1.

At zero speed the point representing the current corresponds to the point g, that is to say, a sufficient value to ensure a proper start, but much lower than the strength Imo which would have appeared on starting to attain the normal operating point 8 in the absence of a current limitation in accordance with the invention.

With such a limitation one reaches the operating point 8 during the normal start up of the motor by passing on the torque curve k section j, d, (FIG. 3) corresponding to the portion 9h, then the section d, c, this latter point c being constituted by the intersection of the plateau 10k and of the curve 5 representing the variation of the motor torque at full power. Finally the section c, 8 on the curve 5 is passed through, until the equilibrium point of the motor operation is reached.

Figure 4:
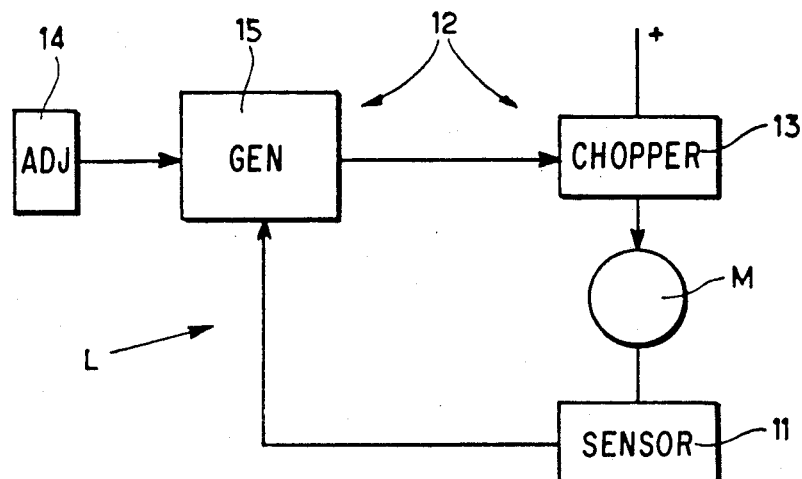
FIG. 4 is a simplified general circuit diagram of a current limiter device making it possible to obtain the diagram of FIG. 3.

Reference is now made to the circuit diagram of FIG. 4 of the limiter device L. The latter comprises means 11 sensing the operating parameter of the electric motor M considered. In the example envisaged, this parameter is constituted by the speed of rotation of the motor and the means 11 are capable of providing data regarding the speed of rotation.

The sensing means 11, sensing the speed of rotation of the motor, can be constituted by any appropriate speed sensor. The sensing means 11 is capable of establishing an output signal advantageously constituted by an electric voltage representing the value of the speed of rotation of the motor M.

The limiter device L comprises, moreover, control means 12 controlling the power supply current of the electric motor in accordance with the output signal of means 11.

Preferably, the power supply of the motor M is ensured by a chopper or slicer device 13 pertaining to the control means 12. The cyclic ratio of the chopper device can be adjusted by adjustment means 14 capable of acting on a generator 15 of the variable cyclic ratio. The output signal of the sensing means 11 is also sent to an input of the generator 15 so as to act on the value of the cyclic ratio.

Figure 5:
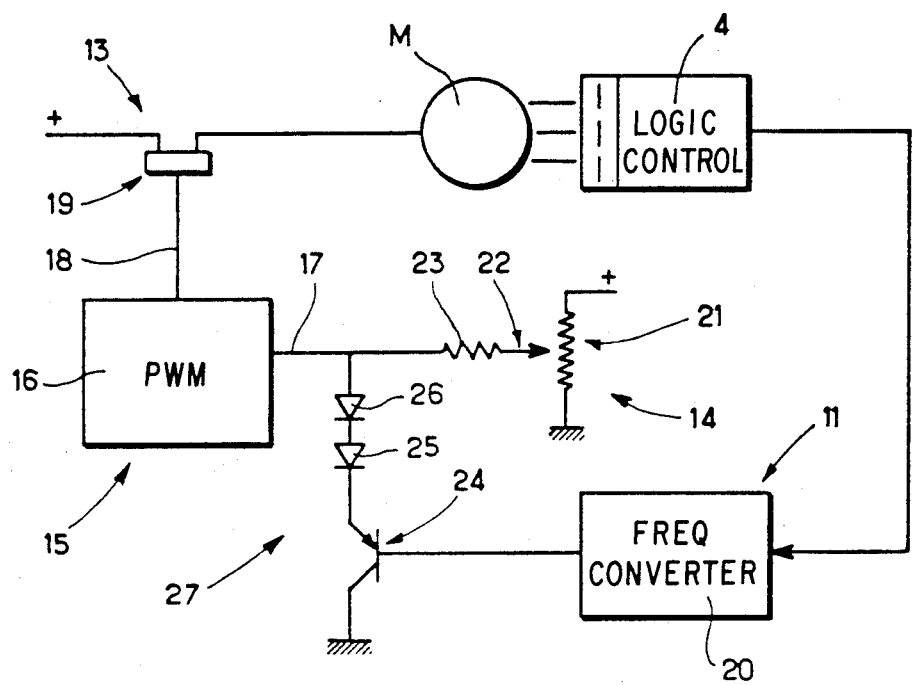
FIG. 5 is a more detailed circuit diagram of an example of the embodiment of the device of FIG. 4.

More precisely, as illustrated in FIG. 5, the variable cyclic ratio generator 15 is constituted by a "PWM" (pulse width modulator) circuit 16 which converts the variations of a control voltage sent to an input 17 into variations of the cyclic ratio of a rectangular signal provided on its output 18. The frequency of the rectangular signal can be defined for example by two fixed components: resistance and capacitance, not represented in the drawing.

This frequency which corresponds to the chopping frequency can be of the order of 20 KHz.

The chopper device 13 comprises a field effect MOS transistor 19 preferably of an N channel type. The gate of this transistor is connected to the output 18 of the PWM circuit.

The sensing means 11 for sensing the speed comprises a frequency/voltage converter 20 which transforms the frequency variations of the pulses or signals on its input into a variation of a direct current voltage. There is no other frquency than that due to the input frequency variations. The frequency of the signals sent to the input of the converter 20 depends directly on the speed of rotation of the motor M.

The adjustment means 14 are of the manual type and comprise a potentiometer 21 connected between the + terminal of a direct current voltage source and ground. The slider 22 of this potentiometer 21 makes it possible to take up an adjustable voltage which is applied by means of a resistor 23 to the input 17 of the circuit 16.

The output of the converter 20 is connected to the base of a transistor 24 which is of the p-n-p type in the example of FIG. 5. The collector of the transistor is grounded while its emitter is connected to the input 17 by means of two diodes 25, 26 mounted in series and conducting in the direction from the input 17 to the emitter of the transistor 24.

The potentiometer 21 represents the speed control and makes it possible to adjust the speed of rotation to the equilibrium point (see FIG. 2), that is to say, to choose either the point 8 (full power) or another point such as 8' (reduced power).

It will be seen that the set of the transistor 24 and of the diodes 25, 26 constitutes the comparing means 27 for comparing the output signal coming from the converter 20 and the signal coming from the potentiometer 21, constituting the adjustment means.

The converter 20 is adjusted to provide on its output, and therefore on the base of the transistor 24, a voltage equivalent to that provided by the control potentiometer 21 to express the motor speed.

The two diodes 25 and 26 establish by the voltage drop Vd which they actuate, and the transistor 24 by the voltage drop Vbe occurring between the base and the emitter, a shift between the signals coming from the output of the converter 20 and the potentiometer 21.

Taking this voltage shift into account introduced by the diodes 25, 26 and the transistor 24 between its base and its emitter, the voltage signal coming from the converter 20 will have priority at the level of the input 17 of the PWM circuit in relation to the signal coming from the potentiometer 21 and will limit the cyclic ratio and hence the current in the motor M according to the speed of rotation of the motor.

If the voltage at the output of the converter 20, applied to the base of the transistor 24, is below the sum of that taken up by the slider 22 of the potentiometer and the voltage drop in the diodes and the transistor 24, the latter passes into the conductive state and the voltage at the input 17 is incorporated by the converter (by means of 24, 25, 26) and no longer by the potentiometer 21.

This mode of operation corresponds in the diagram of FIG. 3 to speeds of rotation below those corresponding to the point c for full power.

If, on the other hand, the sum of the voltage taken up by the slider 22 and the above mentioned voltage drops falls below the voltage at the output of the converter 20, the transistor 24 is blocked and the voltage on the input 17 of the circuit 16 corresponds to that provided by the slider 22.

This mode of operation is obtained for speeds corresponding on the diagram of FIG. 3 to the section from C-8 of curve 5.

Thus the comparing means 27 order a cyclic ratio which corresponds to the lower of the two signals provided respectively on the output of the converter 20 and on the slider 22.

If the speed of the electric motor M becomes zero, in particular if this motor is blocked, the voltage on the input 17 of circuit 16 corresponds to the voltage drop in the diodes 25 and 26, that is to say 2 Vd if the two diodes produce the same volage drop Vd, increased by the voltage drop Vbe between the base and emitter of the transistor 24.

However, if the voltage taken up by the slider 22 is less than the sum of the voltage drop, this lower voltage coming from the control 21 will be reflected in the form of a lower current at the level of the motor M.

Figure 6:
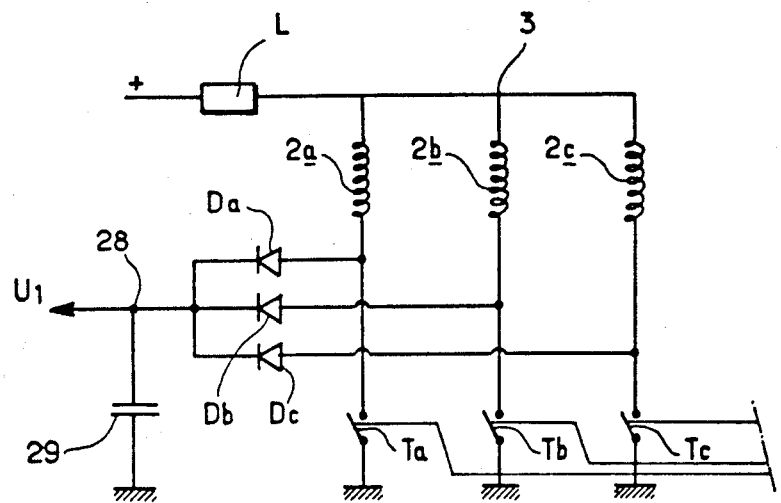
FIG. 6 finally, is a circuit diagram of an arrangement allowing the overvoltages to be recovered.

Referring to FIG. 6, a circuit diagram may be seen of an electric device which makes it possible to recover the over voltage energies from the windings 2a, 2b, 2c of the stator.

In point of fact the MOS field effect transistor 19 of the chopper device 13 is preferably chosen to be of the N channel type and requires for its operation a voltage which is approximately 10 V higher than that of its source, that is to say, a voltage of the order of 25 V or more, which is higher than the supply voltage of a battery or accumulator conventionally used in a motor vehicle.

The P channel type MOS transistors operate with lower voltages, but are less favourable with regard to performance and price.

Since the power required to operate the N channel type MOS transistor is on the low side, it is advantageous to recover the overvoltage energies from the windings 2a, 2b, 2c to establish an auxiliary voltage U1 which is higher than the the supply voltage.

For this purpose, the ends of the windings 2a, 2b, 2c on the opposite side to those connected to the common point 3, are themselves connected by diodes Da, Db, Dc to a common point 28. Because the common point 3 is connected to the + terminal, the anode of diodes Da, Db, Dc is connected to the end of the corresponding winding up line from the switching means Ta, Tb, Tc. Irrespective of the open or closed state of these switching means, the connection between the winding and the anode of the associated diode remains. The cathodes of the diodes are connected to the point 28.

A capacitor 29 is connected between the point 28 and ground. The auxiliary voltage U1, higher than the supply voltage, is thus available between the point 28 and ground to operate the N channel type MOS transistor 19.

It should be noted that the overvoltage energy of the windings 2a, 2b, 2c can be only that of the end of the actuation of the winding (or of the phase), when one is at maximum power. In that case the chopping transistor 19 is permanently closed, but for this purpose the boosted control voltage must also be available.

A particularly worthwhile application of the limiter device of the invention concerns an electric motor intended to drive a fan or blower in a motor vehicle. As has already been explained above, the resistant torque set up by such a load is substantially proportional to the square of the speed and corresponds to the curve 7 of FIGS. 2 and 3.

The functioning of a direct current electric motor supplied by a limiter device in accordance with the invention, for driving such a load follows directly from the above explanations.

If the adjustment means 14, and more particularly the potentiometer 21 (FIG. 5) are adjusted to the maximum speed, corresponding to the maximum power of the motor, the torque curve of the electric motor in the absence of any limitation corresponds to curve 5 of FIGS. 2 and 3.

As has already been explained, the current strength will increase in relation to the speed according to the limitation curve g, while the torque of the motor will increase according to the curve k until it joins the normal torque curve 5 at point c. From this point, the limiter device no longer exerts any influence, because the strength required by the motor is less than that which can be supplied by the limiter device.

In some way the control effected by the adjustment means 14 expresses the value of the current necessary from the point of view of the desired operation, but this value will in effect be authorized only gradually by the limiter device L as the motor gathers speed.

If the motor is blocked, the strength of the current in the stator will increase according to the normal curve 6, (FIG. 3) in the direction of decreasing speeds, as far as the plateau 10. The point representing the strength will then be displaced along this plateau, then over section 9, (that is to say on curve g), to assume value e when the motor is stopped.

A similar process would take place with lower values in the case where the adjustment means 14 would show a balanced motor power, and hence a balanced speed being respectively below the maximum speed and power.

With such a limiter device the various electronic components, the transistors in particular, are suitably protected without requiring any other circuit.

By way of example, at 3000 r.p.m. an electric motor driving a car fan at a voltage of 14.4. V generally does not consume more than 15 A. Such a motor without a limiter device in accordance with the invention would let nearly 50 A pass at the same voltage if it were blocked. If it were necessary to provide transistors capable of accepting a strength of 50 A in the case of a blocked load, the cost of the electronic switching means would become prohibitive.

The limiter device of the invention makes it possible to prevent such an overvoltage and therefore to use as the electronic switching means, transistors designed to accept the normal maximum current strength, with absolute safety.

On the same occasion, the protection of the electric motor is ensured against overheating during a blockage in rotation.

I claim:

1. A limiter device limiting the current for a direct current electric motor with electronic switching, a stator of the motor comprises several windings, angularly displaced and energized successively by an electronic switching means to create a rotating field, the motor being to drive a load which sets up a resisting torque increasing in relation to the speed of rotation, said limiter device comprising:

sensor means connected to said motor, said sensor means for sensing the speed of rotation of said motor and outputting a signal representing the speed of rotation;

a control means connected to said motor, said control means for controlling a power supply current for said motor according to the output signal from said sensor means, said control means including a chopper device for energizing said motor with a cyclic ratio;

an adjustment means for adjusting the cyclic ratio of said chopper device; and a comparing means connected to said control means, said adjustment means, and said sensor means; said comparing means for comparing the output signal of said sensor means and a signal from said adjustment means, said comparing means controls the cyclic ratio of the control means to correspond to a lower signal value of the output signal of the sensor means and the signal from the adjustment means, wherein said comparing means establishes a limitation relation of the motor current according to the speed of the motor and variation of the load driven by the motor, said comparing means including a current authorizing means for authorizing a slightly higher current than that necessary for normal operation of the motor; the current limiting relation established by said comparing means ensures a sufficient margin at a starting of the motor and a satisfactory rise in speed of the motor, said relation for the variation of the current in relation to the speed of rotation of the motor having a rising portion.

2. A limiter drive according to claim 1, wherein said control means comprising a PWM type circuit capable of converting the variations of a control voltage into a variation of the cyclic ratio of a rectangular signal; said sensor means comprising a frequency/voltage converter which receives at an input, signals whose frequency depends on the speed of rotation of the motor and which provides at an output a voltage representing this speed; said adjustment means comprising a potentiometer for adjusting the value of the cyclic ratio, wherein said comparing means for comparing the output signal of the frequency/voltage converter and that of the potentiometer, and being capable of causing the cyclic ratio to be established which corresponds to the lower signal coming from the frequency/voltage converter or the potentiometer.

3. A limiter device according to claim 2 wherein the comparing means comprise a transistor whose base is connected to the output of the frequency/voltage converter and whose emitter is connected, in particular, by two diodes mounted in series to the slider of the potentiometer.

4. A limiter device according to claim 1 wherein said chopper device comprises an N channel field effect MOS transistor, said chopper device being arranged so as to recover the overvoltage energies of the windings of the stator which occur, in particular at the end of the actuation of each winding, for establishing the operating voltage of the N channel MOS transistor.

5. A limiter device according to claim 1 wherein said motor with electronic switching having the stator comprising three phases or windings each controlled by at least one of a single transistor and interrupter.

6. A limiter device according to claim 1 wherein said electric motor drives in particular, a fan, a turbine blower, or a pump in a motor vehicle which has a resisting torque substantially proportional to the square of the speed of rotation, the relation for the variation of the current strength in relation to the speed of rotation of the motor then being chosen to be substantially linear with a positive gradient in a first portion and with an ordinate at the origin which corresponds to a relatively low starting torque.

7. A limiter device according to claim 1 wherein said relation for the variation of the current in relation to the speed of rotation of the motor having a plateau after said rising portion.

* * * * *